United States Patent
Xiao et al.

(10) Patent No.: US 10,440,144 B2
(45) Date of Patent: Oct. 8, 2019

(54) NEAR REAL TIME NOTIFICATIONS DISTRIBUTION PLATFORM

(71) Applicant: Microsoft Technology Licensing, LLC, Redmond, WA (US)

(72) Inventors: Pingjie Xiao, Sunnyvale, CA (US); Shaunak Chatterjee, Sunnyvale, CA (US); Shipeng Yu, Sunnyvale, CA (US); Ankit Gupta, Fremont, CA (US); Swapnil Ghike, Sunnyvale, CA (US); Vivek Nelamangala, Belmont, CA (US); Banu Muthukumar, Sunnyvale, CA (US); Curtis Wang, Santa Clara, CA (US); Parinkumar Shah, Milpitas, CA (US); Eric Brownrout, San Francisco, CA (US); Changji Shi, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/826,462

(22) Filed: Nov. 29, 2017

(65) Prior Publication Data
US 2019/0166224 A1     May 30, 2019

(51) Int. Cl.
*H04L 29/06* (2006.01)
*H04L 29/08* (2006.01)
*H04L 12/24* (2006.01)
*G06F 21/60* (2013.01)

(52) U.S. Cl.
CPC ............ *H04L 67/306* (2013.01); *H04L 41/12* (2013.01); *H04L 41/22* (2013.01); *H04L 67/26* (2013.01)

(58) Field of Classification Search
USPC .......................................... 709/204–206, 223
See application file for complete search history.

(56) References Cited

U.S. PATENT DOCUMENTS

| 8,874,612 | B2* | 10/2014 | Tiu, Jr. | H04L 51/32 |
| | | | | 707/778 |
| 9,600,583 | B2* | 3/2017 | Zhu | G06Q 50/01 |
| 9,707,486 | B1* | 7/2017 | Cantor | A63F 13/12 |
| 2012/0136689 | A1* | 5/2012 | Ickman | H04W 4/21 |
| | | | | 705/7.19 |
| 2014/0359786 | A1* | 12/2014 | Lee | G06F 21/10 |
| | | | | 726/27 |

(Continued)

*Primary Examiner* — Jude Jean Gilles
(74) *Attorney, Agent, or Firm* — Schwegman Lundberg & Woessner, P.A.

(57) ABSTRACT

A notification platform for distribution of notification content in an on-line social network system, on-line and in near real time, is described. As a new notification is detected in the continuous stream of notifications triggered by time-sensitive events, the near real time notifications distribution system determines member profiles representing potential recipients of the notification by traversing a relationship graph. The relationship graph has nodes representing member profiles, as well as other entities maintained in the on-line social network system. The edges of the relationship graph represent relationships between entities represented by the associated nodes. For each member profile representing a potential recipient of the notification, the near real time notifications distribution system generates a relevance score, which is used to determine whether the notification is to be delivered to the potential recipient.

20 Claims, 4 Drawing Sheets

(56) References Cited

U.S. PATENT DOCUMENTS

| | | | |
|---|---|---|---|
| 2015/0310472 A1* | 10/2015 | Davidson | G06Q 30/0222 705/14.23 |
| 2015/0334117 A1* | 11/2015 | Terleski | G06Q 50/01 726/27 |
| 2018/0061033 A1* | 3/2018 | Bastide | G06T 7/0002 |

* cited by examiner

NEAR REAL TIME NOTIFICATIONS DISTRIBUTION PLATFORM

TECHNICAL FIELD

This application relates to the technical fields of software and/or hardware technology and, in one example embodiment, to system and method for near real time notifications distribution in an on-line social network system.

BACKGROUND

An on-line social network may be viewed as a platform to connect people in virtual space, where registered members establish and document networks of people. Each registered member of an on-line social network may be represented by a member profile, which, in turn, may be represented by one or more web pages, a structured representation of the member's information in XML (Extensible Markup Language), JSON (JavaScript Object Notation) or similar format. A member's profile web page of a social networking web site may emphasize employment history and education of the associated member. An on-line social network system also may be configured to facilitate communication among members by, e.g., providing updates relevant to members in the form of notifications.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
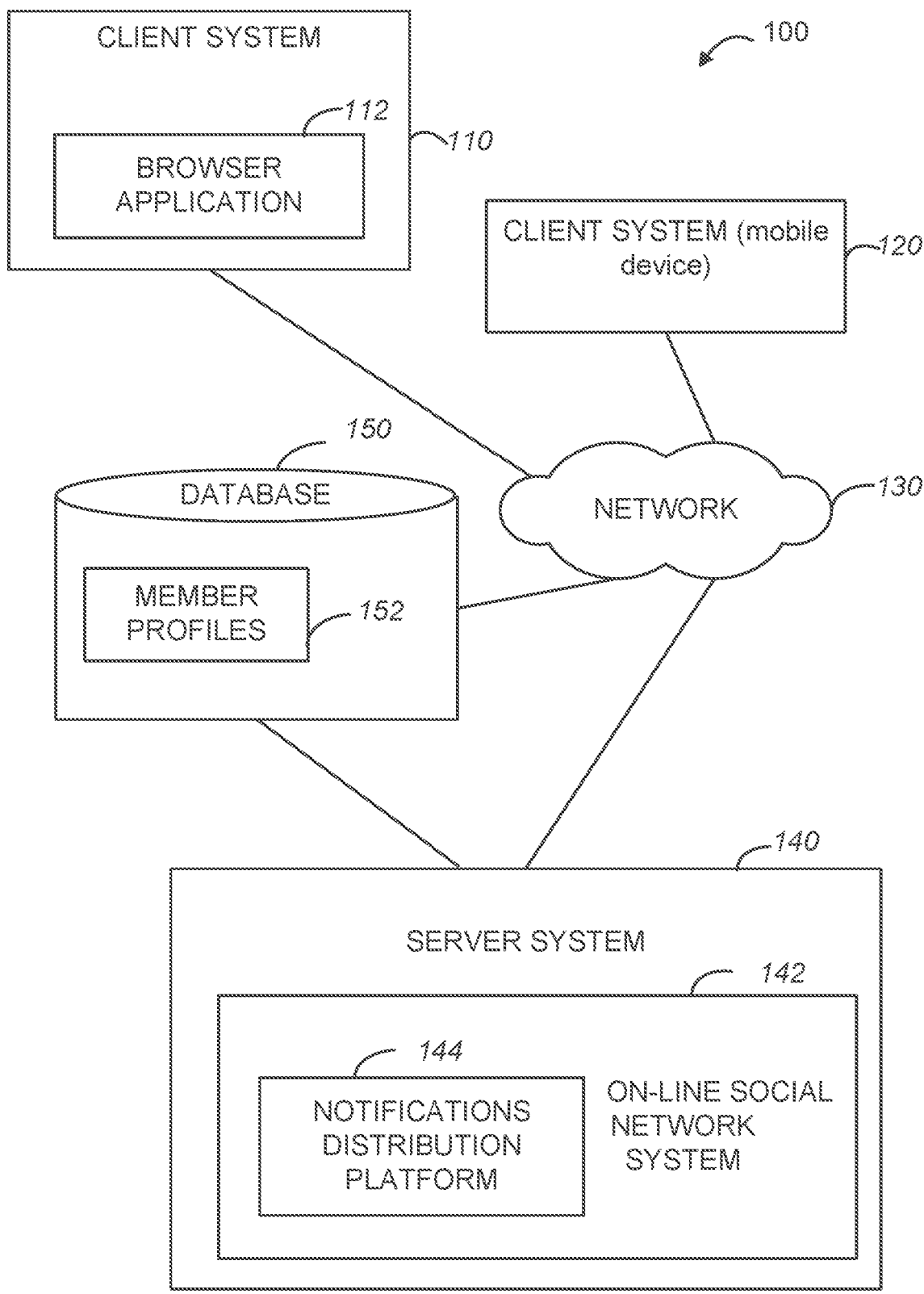
FIG. 1 is a diagrammatic representation of a network environment within which an example method and system for near real time notifications distribution in an on-line social network system may be implemented.

A method and system for near real time notifications distribution in an on-line social network system in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile) A member profile may be associated with social links that indicate the member's connection to other members of the social network. A member profile may also include or be associated with comments or recommendations from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, provide recommendations and endorsements for each other and otherwise be in touch via the social network.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills, such as, e.g., "product management," "patent prosecution," "image processing," etc.). The profile of a member may also include information about the member's current and past employment, such as company identifications, professional titles held by the associated member at the respective companies, as well as the member's dates of employment at those companies.

The on-line social network system is configured to facilitate interactions among members by permitting members to share content, such as, e.g., publications related to science and technology or any other topic. A member can use the on-line social network system to indicate their interest in content (content shared by other members or sponsored content) by "liking" the content item and/or commenting on the content item. The on-line social network system includes a notifications distribution platform that distributes an input content stream in the form of notifications. Notifications are information items intended to alert a member to content that they may find to be of interest. A notification may be with respect to a user action that makes changes to their member profile, such as, e.g., change of employment, a new connection, etc. A notification may also be with respect to an action initiated by a member, such as, e.g., sharing, liking, or commenting on a publication in the on-line social network system, making a change to their profile, connecting with another member, etc. A member profile that triggered a notification generation—e.g., a profile representing a member who shared or interacted with content or a profile from which notification content was derived—is referred for the purposes of this description as a triggering profile. A member profile representing a member that has been identified as being potentially interested in receiving a given notification is referred for the purposes of this description as a candidate profile.

In one example embodiment, the notifications of different types include features that have meaning across different notification types such that these features can be used to generate comparable relevance scores with respect to candidate profiles. The relevance score calculated for a notification with respect to a member profile is used to determine whether the notification is to be presented to the member represented by the member profile. For example, a notification may be omitted from a user interface configured to present notifications to a member, unless the relevance score for the notification with respect to that member's profile is equal to or greater than a predetermined threshold value. These thresholds can be hard-coded, or could be personalized for each member. As another example, where multiple notifications have been determined, based on their respective relevance scores, as sufficiently relevant with respect to a member profile, a certain predetermined number of notifications having the highest relevance scores are selected for inclusion into a user interface configured to present notifications to a member. Respective relevance scores generated for notifications with respect to a candidate profile can also be used to determine an order, in which notifications are presented to the member represented by the candidate profile.

There are certain types of notifications being generated in the on-line social network system that are time-sensitive. The technical problem of identifying member profiles that represent members who are likely to interact with a notification and of delivering such time-sensitive notifications in a timely manner (e.g., in near real time) to the identified recipients is addressed by the methodologies described herein. Specifically, in order to identify member profiles representing recipients of a given notification, the notifications distribution platform is configured to utilize an economic graph in a manner described in further detail below.

The notifications distribution platform is a near real time notifications distribution system. It is configured to detect a new notification, determine potential recipients of the notification in the on-line social network system, evaluate relevance of the notification with respect to respective potential recipients, and selectively deliver the notification to those recipients that have been identified as the actual target recipients. In one example embodiment, the near real time notifications distribution system is configured to perform these operations on-line and in near-real time. The notifications that are being processed on-line and in near-real time are those notifications that are time sensitive. Examples of time sensitive notifications are those triggered by a user's action on the web site, such as, e.g., sharing a news article or commenting on an item in their news feed. Other examples of events that trigger the generating of time-sensitive notifications are breaking news, a member indicating a job change in their profile, etc.

As a new notification is detected in the continuous stream of notifications triggered by time-sensitive events, the near real time notifications distribution system determines member profiles representing potential recipients of the notification by traversing a so-called economic graph (also referred as relationship graph, for the purposes of this description).

The economic graph has nodes representing member profiles, as well as other entities maintained in the on-line social network system, such as, e.g., companies, schools, industries, topics, etc. The edges of the economic graph represent relationships between entities represented by the associated nodes. Examples of relationships represented by edges of the economic graph include connections between member profiles, follow relationship between a member profile and another entity, as well as affinity between a member profile and an attribute associated with another entity. For example, a member represented by a member profile may follow a particular topic that is represented by an entity in the on-line social network system and is also represented by a node in the economic graph. The particular topic may, in turn, may be associated with attributes (e.g., with tags representing professional skills of members of the on-line social network system). An edge between a node representing a given member profile and a node representing the topic entity may indicate that the member, even if they do not follow the topic, are nonetheless interested in the professional skills that are the attributes of that topic entity. In some embodiments, the attributes can also be represented by respective nodes in the economic graph, and multiple topics could share the same/overlapping attributes. Thus, a member may not have an edge to a topic, but could have an edge to the nodes that represent attributes of the topic.

As mentioned above, for each member profile representing a potential recipient of the notification, the near real time notifications distribution system generates a relevance score using features that measure one or more of affinity between the triggering profile and the candidate profile and affinity between the candidate profile and the content of the notification. Said features may be co-located with relevance computation to increase the timeliness of delivery of notifications to recipients.

The notifications can be delivered to recipients together with so-called context information. The context information with respect to a notification provided to a given notification recipient is determined based on the edges in the economic graph that were used by the near real time notifications distribution system to identify the recipient. For example, context information may state that the member is receiving the notification because the member who triggered the notification generation (e.g., the member who commented on a post in the on-line social network system) is a connection of the recipient. As another example, context information may state that the member is receiving the notification because the member who is the recipient of the notification follows a particular topic and the news article that is the subject of the notification is related to that particular topic. Example platform for distributing notifications in an on-line social network system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a notification platform 144 for creation and distribution of notifications using the methodologies described above. An example notification platform 144 is illustrated in FIG. 2.

Figure 2:
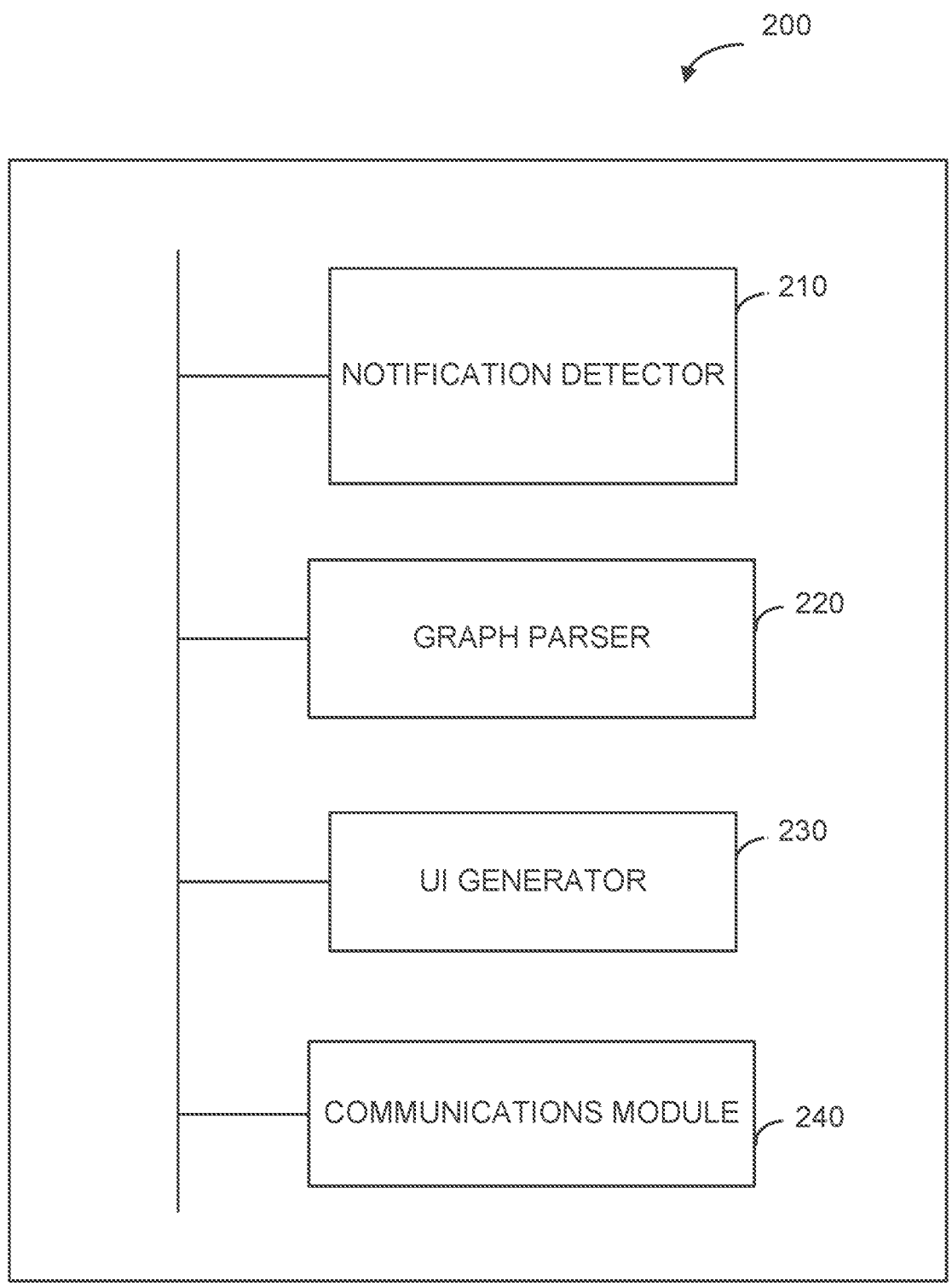
FIG. 2 is block diagram of a system for near real time notifications distribution in an on-line social network system, in accordance with one example embodiment.

FIG. 2 is a block diagram of a system 200 for near real time notifications distribution in an on-line social network system, in accordance with one example embodiment. The system 200, in some embodiments, corresponds to the notification platform 144. As shown in FIG. 2, the system 200 includes a notification detector 210, a graph parser 220, a UI generator 230, and a communications module 240.

The notification detector 210 is configured to detect notifications in the on-line social network system. A notification is typically with respect to a content item and a triggering profile, as described above. In some embodiments, the triggering profile may be a so-called "System recommends" profile. The "System recommends" profile is an entity in the on-line social network system that can be a source of notifications pushed to members.

The graph parser is configured to access a previously stored relationship graph (referred to as an economic graph in the description above). The relationship graph has nodes and edges and, in particular has a node representing the triggering profile and a node representing an entity related to the content item. The node representing an entity related to the content item is referred to as a content node. The edges in the relationship graph represent respective relationships between entities represented by the associated nodes. The notification detector 210 is also configured to determine, from nodes representing profiles from the member profiles in the relationship graph, one or more candidate profiles represented by respective candidate nodes in the relationship graph, based on the content node and the node representing the triggering profile. As described above, a candidate node may be selected if an edge associated with said node indicates a connection or a follow relationship with respect to a node representing the triggering profile. As another example, a candidate node may be selected if an edge associated with said node indicates affinity between the member represented by the candidate profile and the entity represented by the content node.

The UI generator 230 is configured to generate a user interface (UI) that includes one or more notifications that have been selected, based on their respective relevance scores, for presentation to the member represented by a candidate profile. The communications module 240 is configured to cause the UI to be displayed on a display device of a member represented by the candidate profile. Some operations performed by the system 200 may be described with reference to FIG. 3.

Figure 3:
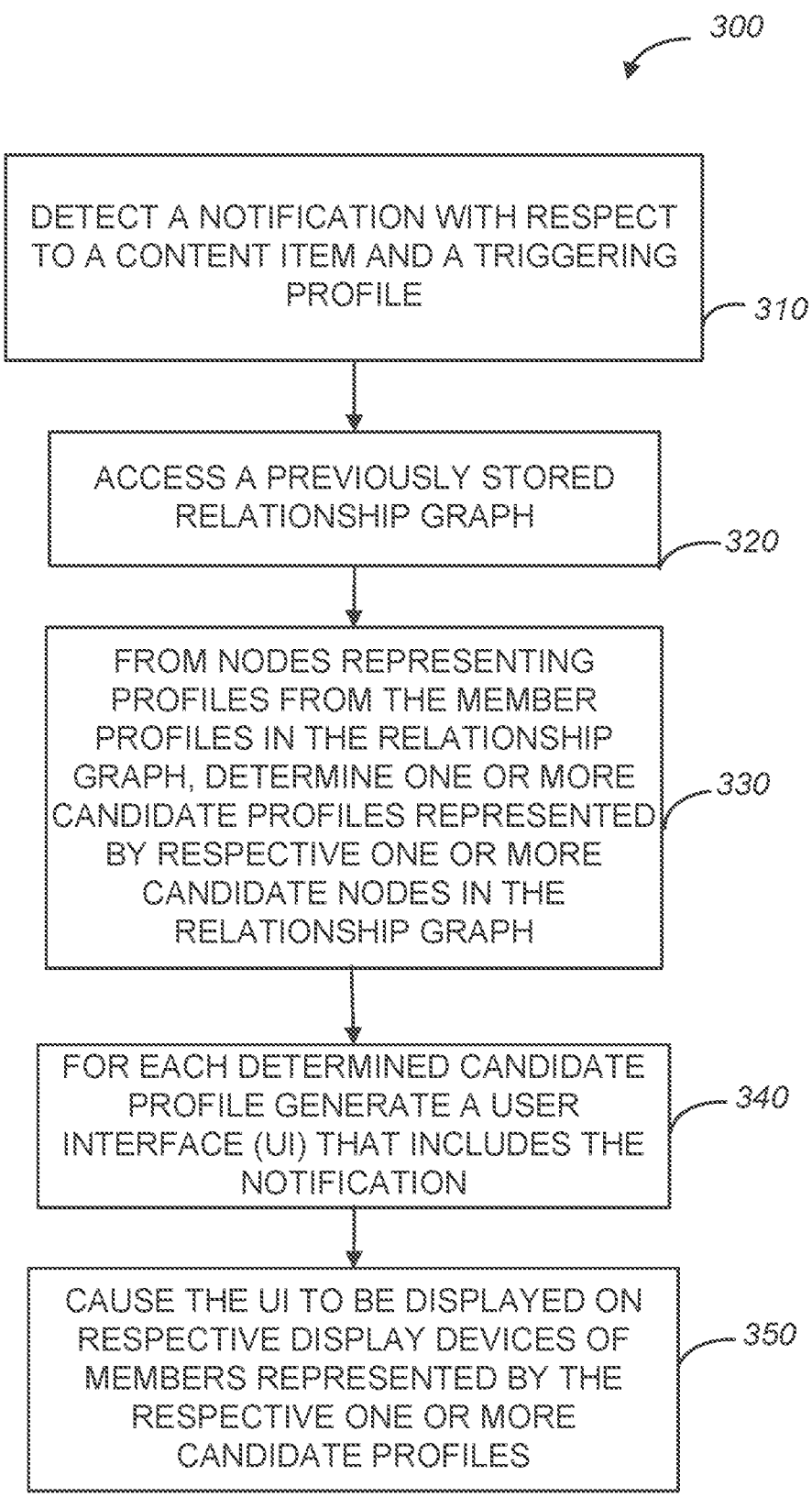
FIG. 3 is a flow chart of a method for near real time notifications distribution in an on-line social network system, in accordance with an example embodiment.

FIG. 3 is a flow chart of a method 300 for near real time notifications distribution in an on-line social network system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when a notification is detected in the continuous stream of notifications triggered by time-sensitive events in the on-line social network system. The relationship graph is accessed at operation 320 and is used to determine, at operation 330, one or more candidate profiles represented by respective candidate nodes in the relationship graph. A candidate node is identified based on the content node and the node representing the triggering profile.

Subsequent to determining that the notification is to be presented to a member represented by the particular candidate profile, the UI generator generates a user interface (UI) that includes the notification, at operation 240. The communications module 240 causes the UI to be displayed on a display device of a member represented by the candidate profile, at operation 250.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
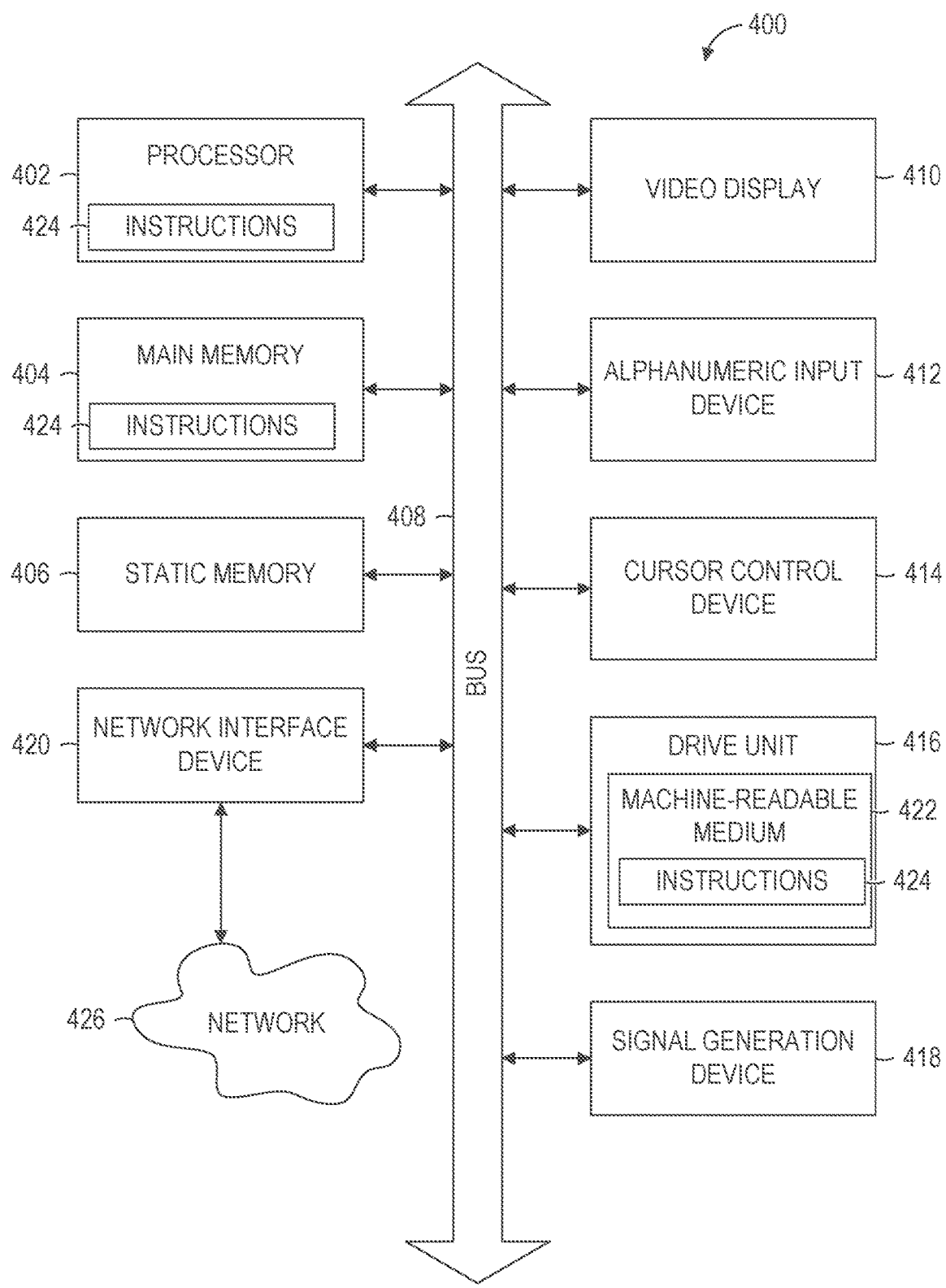
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD)

or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system for near real time notifications distribution in an on-line social network system have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
in an on-line social network system that maintains member profiles representing members of the on-line social network system, detecting a notification with respect to a content item and a triggering profile from the member profiles;
on-line and in response to the detecting of the notification, using at least one processor, accessing a previously stored relationship graph comprising a node representing the triggering profile and a content node, the content node representing an entity related to the content item, edges in the relationship graph representing respective relationships between entities represented by the associated nodes;
from nodes representing profiles from the member profiles in the relationship graph, determining one or more candidate profiles represented by respective candidate nodes in the relationship graph, based on the content node and the node representing the triggering profile;
in response to determining that the notification is to be presented to a member represented by a profile from the one or more candidate profiles, generating a user interface (UI) that includes the notification; and
causing the UI to be displayed on a display device.

2. The method of claim 1, wherein the determining of the one or more candidate profiles comprises identifying, in the relationship graph an edge indicating that the triggering profile includes a link indicating its connection with a profile from the one or more candidate profiles.

3. The method of claim 2, wherein the generating of the UI that includes the notification comprises inserting, in the UI, context information indicating that the notification is related to a connection of a member represented by the profile from the one or more candidate profiles.

4. The method of claim 1, wherein the determining of the one or more candidate profiles comprises identifying, in the relationship graph an edge indicating affinity between a profile from the one or more candidate profiles and the entity represented by the content node.

5. The method of claim 4, wherein the generating of the UI that includes the notification comprises inserting, in the UI, context information indicating that the notification is related to the entity followed by a member represented by the profile from the one or more candidate profiles.

6. The method of claim 4, wherein the entity is one of a company or a topic.

7. The method of claim 1, wherein the determining of the one or more candidate profiles comprises identifying, in the relationship graph an edge indicating affinity between a profile from the one or more candidate profiles and an attribute of the entity represented by the content node.

8. The method of claim 7, wherein the attribute is a string representing a professional skill.

9. The method of claim 1, wherein the determining that the notification is to be presented to the member represented by the profile from the one or more candidate profiles comprises generating a relevance score for the notification with respect to the profile, using features reflecting affinity between the profile and the content item.

10. The method of claim 9, wherein the features reflecting affinity between the profile and the content item are stored locally with respect to the operation of determining the candidate profile or are fetched over a network from a remote server.

11. A system comprising:
one or more processors; and
a non-transitory computer readable storage medium comprising instructions that when executed by the one or processors cause the one or more processors to perform operations comprising:
in an on-line social network system that maintains member profiles representing members of the on-line social network system, detecting a notification with respect to a content item and a triggering profile from the member profiles;
on-line and in response to the detecting of the notification, accessing a previously stored relationship graph comprising a node representing the triggering profile and a content node, the content node representing an entity related to the content item, edges in the relationship graph representing respective relationships between entities represented by the associated nodes;
from nodes representing profiles from the member profiles in the relationship graph, determining one or more candidate profiles represented by respective candidate nodes in the relationship graph, based on the content node and the node representing the triggering profile;
in response to determining that the notification is to be presented to a member represented by a profile from the one or more candidate profiles, generating a user interface (UI) that includes the notification; and
causing the UI to be displayed on a display device.

12. The system of claim 11, wherein the determining of the one or more candidate profiles comprises identifying, in the relationship graph an edge indicating that the triggering profile includes a link indicating its connection with a profile from the one or more candidate profiles.

13. The system of claim 12, wherein the generating of the UI that includes the notification comprises inserting, in the UI, context information indicating that the notification is related to a connection of a member represented by the profile from the one or more candidate profiles.

14. The system of claim 11, wherein the determining of the one or more candidate profiles comprises identifying, in the relationship graph an edge indicating affinity between a profile from the one or more candidate profiles and the entity represented by the content node.

15. The system of claim 14, wherein the generating of the UI that includes the notification comprises inserting, in the UI, context information indicating that the notification is related to the entity followed by a member represented by the profile from the one or more candidate profiles.

16. The system of claim 14, wherein the entity is one of a company or a topic.

17. The system of claim 11, wherein the determining of the one or more candidate profiles comprises identifying, in the relationship graph an edge indicating affinity between a profile from the one or more candidate profiles and an attribute of the entity represented by the content node.

18. The system of claim 17, wherein the attribute is a string representing a professional skill.

19. The system of claim 11, wherein the determining that the notification is to be presented to the member represented by the profile from the one or more candidate profiles comprises generating a relevance score for the notification with respect to the profile, using features reflecting affinity between the profile and the content item.

20. A machine-readable non-transitory storage medium having instruction data executable by a machine to cause the machine to perform operations comprising:

in an on-line social network system that maintains member profiles representing members of the on-line social network system, detecting a notification with respect to a content item and a triggering profile from the member profiles;

on-line and in response to the detecting of the notification, accessing a previously stored relationship graph comprising a node representing the triggering profile and a content node, the content node representing an entity related to the content item, edges in the relationship graph representing respective relationships between entities represented by the associated nodes;

from nodes representing profiles from the member profiles in the relationship graph, determining one or more candidate profiles represented by respective candidate nodes in the relationship graph, based on the content node and the node representing the triggering profile;

in response to determining that the notification is to be presented to a member represented by a profile from the one or more candidate profiles, generating a user interface (UI) that includes the notification; and causing the UI to be displayed on a display device.

\* \* \* \* \*